United States Patent [19]
Mitoh

[11] Patent Number: 4,627,158
[45] Date of Patent: Dec. 9, 1986

[54] APPARATUS FOR SETTING DOORS TO VEHICLE BODIES
[75] Inventor: Syunji Mitoh, Higashihiroshima, Japan
[73] Assignee: Mazda Motor Corporation, Japan
[21] Appl. No.: 762,331
[22] Filed: Aug. 5, 1985
[30] Foreign Application Priority Data Aug. 13, 1984 [JP] Japan .................. 59/169127
Aug. 13, 1984 [JP] Japan .................. 59/169128
Aug. 13, 1984 [JP] Japan .................. 59/169129

[51] Int. Cl.$^4$ ............... B23P 21/00; B23P 19/00
[52] U.S. Cl. ........................... 29/771; 29/824
[58] Field of Search ............. 29/700, 703, 702, 709, 29/771, 784, 787, 822–824

[56] References Cited
U.S. PATENT DOCUMENTS
1,750,130  3/1930  Romine ................. 29/824

FOREIGN PATENT DOCUMENTS
5748334  3/1977  Japan .
53-36627  10/1978  Japan ................. 29/824
54-5276  6/1979  Japan ................. 29/824
57-83328  5/1982  Japan ................. 29/823

Primary Examiner—Howard N. Goldberg
Assistant Examiner—Steven Nichols
Attorney, Agent, or Firm—Gerald J. Ferguson, Jr.; Michael P. Hoffman; James E. Bryan

[57] ABSTRACT

An apparatus for setting a door to a vehicle body comprises a robot movable along a vehicle body assembly line and operative to hold and carry a door with a predetermined working path, a plurality of pallets for sorting and storing doors of plural different types thereon, and door positioning means for positioning a door taken out by the robot from one of the pallets in proper relation to the robot. In operation, the robot picks out one of the doors sorted on said pallets, which is fit for a vehicle body conveyed to or to be conveyed to a door mounting station in the vehicle body assembly line, to cause the same to engage with the door positioning means so that the door picked out by the robot is positioned by the positioning means, and then holds and carries the door positioned by the door positioning means to set the same to the vehicle body at the door mounting station.

17 Claims, 10 Drawing Figures

APPARATUS FOR SETTING DOORS TO VEHICLE BODIES

BACKGROUND OF THE INVENTION

1. Field of the Invention

The present invention relates generally to apparatus for setting doors to vehicle bodies in vehicle body assembly lines, and more particularly, to a door setting apparatus provided at a door mounting station in a vehicle body assembly line and employing a robot for picking out one of doors sorted on a plurality of pallets, which is fit for a vehicle body conveyed or being to be conveyed to the door mounting station, and for setting automatically the selected door to a door supporting portion of the vehicle body staying at the door mounting station.

2. Description of the Prior Art

In a previously proposed vehicle body assembly line, a door which is to be mounted on a vehicle body conveyed into a door mounting station is supplied from a door delivering apparatus to a door setting device so as to be set thereby to the vehicle body staying at the door mounting station and then the position of the door set to the vehicle body is adjusted by one or more workers so that the door is put properly on a door supporting portion provided on the vehicle body, as disclosed in, for example, the Japanese patent application published after examination with the publication No. 57/48334 on Oct. 15, 1982. This means that the door setting process at the door mounting station in the vehicle body assembly line has been partially automated and still includes some work being out of the mechanical control, such as adjustment of the position of the door in relation to the door supporting portion of the vehicle body, and therefore it is desired that the door setting process is much more automatized or advanced in reduction of labor. Accordingly, it has been proposed to introduce an industrial robot, which has been recently spread in various fields of industry, especially, in the manufacturing industry, into the door mounting station in the vehicle body assembly line for setting automatically the door to the door supporting portion of the vehicle body, and a playback robot of the articulated type which operates with a predetermined working path and is capable of being used at the door mounting station in the vehicle body assembly line has been developed.

However, in the case where the vehicle body assembly line is so arranged that a plurality of vehicle bodies of several different kinds are assembled therein and the vehicle bodies of several differents kinds conveyed successively to the door mounting station therein are provided with respective doors at the door mounting station, or the vehicle body assembly line is so arranged that a plurality of vehicle bodies of a single kind are assembled therein and each of the vehicle bodies of a single kind conveyed successively to the door mounting station therein is provided with two or more different doors, for example, front and rear doors at the door mounting station, and such a robot as mentioned above is used for setting automatically each door to a corresponding door supporting portion provided on the vehicle body staying at the door mounting station, there are the following problems.

In the vehicle body assembly line wherein the doors of plural different types are selectively and automatically set to the vehicle bodies by the robot at the door mounting station, the doors are sorted on plural pallets each making a group of doors of the same type and one of the sorted doors which is selected in accordance with the vehicle body conveyed to the door mounting station is picked out by the robot and then set to a corresponding door supporting portion of the vehicle body staying at the door mounting station through the movement of the robot. Each of the pallets used for sorting the doors in such a vehicle body assembly line as mentioned above, which may be required to be capable of holding any of the doors of plural different types and also to be movable, is usually formed with not so high dimensional precision. Further, the doors put on the pallet are loosely held thereby so as to be easily and smoothly removed therefrom by the robot. Accordingly, the position of each of the pallets or the position of each of the doors sorted on the pallets tends to be undesirably dislocated from a predetermined working path of the robot.

Under such conditions, if the position of the pallet or the position of each of the doors on the pallet is dislocated from the working path of the robot, the robot may hold the selected door in an improper manner and as a result the selected door may not be set properly to the door supporting portion of the vehicle body.

Further, if the vehicle body conveyed into the door mounting station is caused to stay at a position deviated from a predetermined regular position in the door mounting station due to, for example, positional deviation of the vehicle body from a regular position on a conveyer in the vehicle body assembly line, the robot may not set properly the selected door held thereby to the door supporting portion of the vehicle body staying at the door mounting station.

OBJECTS AND SUMMARY OF THE INVENTION

Accordingly, it is an object of the present invention to provide an apparatus for setting a door to a vehicle body which avoids the foregoing problems encountered with the prior art.

Another object of the present invention is to provide an apparatus for setting a door to a vehicle body, which employs a robot operating with a predetermined working path to pick out one of doors sorted on a plurality of pallets which is fit for a vehicle body conveyed or being to be conveyed to a door mounting station in a vehicle body assembly line and then to set automatically the selected door to the vehicle body staying at the door mounting station, and can set surely and accurately the door to a corresponding door supporting position provided on the vehicle body.

A further object of the present invention is to provide an apparatus for setting a door to a vehicle body, which employs a robot operating with a predetermined working path to pick out one of doors sorted on a plurality of pallets which is fit for a vehicle body conveyed or being to be conveyed to a door mounting station in a vehicle body assembly line and then to set automatically the selected door to the vehicle body staying at the door mounting station, and in which the selected door is held by the robot always in a proper manner so that positional deviation of the selected door set to the vehicle body by the robot from a corresponding door supporting portion provided on the vehicle body is eliminated.

A still further object of the present invention is to provide an apparatus for setting a door to a vehicle body, which employs a robot operating with a predetermined working path to pick out one of doors sorted on a plurality of pallets which is fit for a vehicle body conveyed or being to be conveyed to a door mounting station in a vehicle body assembly line and then to set automatically the selected door to the vehicle body staying at the door mounting station, and in which positional deviation of the selected door set to the vehicle body by the robot from a corresponding door supporting portion provided on the vehicle body is eliminated even though the vehicle body conveyed into the door mounting station is caused to stay at a position deviated from a predetermined regular position in the door mounting station.

According to an aspect of the present invention, there is provided an apparatus for setting a door to a vehicle body comprising; a robot installed on a carriage movable along a vehicle body assembly line and operating with a predetermined working path to hold and carry a door, a plurality of pallets arranged along a moving direction of the carriage on which the robot is installed for sorting and storing doors of plural different types thereon, and door positioning means for positioning a door taken out by the robot from one of the pallets in proper relation to the robot. The apparatus is so constituted that when a vehicle body is conveyed to a door mounting station in the vehicle body assembly line, the robot picks out one of the doors sorted on the pallets which is fit for the vehicle body conveyed or being to be conveyed to the door mounting station to cause the same to engage with the door positioning means so that the door picked out by the robot is positioned by the positioning means, and then holds and carries the door positioned by the door positioning means to set the same to the vehicle body at the door mounting station.

In a preferred embodiment of apparatus according to the present invention taken by way of example, in addition to such robot, a plurality of pallets and door positioning mean as mentioned above, body position detecting means is also provided for detecting the position of the vehicle body conveyed to and caused to stay at the door mounting station, and the predetermined working path of the robot is compensated to be appropriate for the actual position of the vehicle body at the door mounting station in response to the detection output of the body position detecting means.

Further, in the embodiment of apparatus according to the present invention, the carriage on which the robot is installed is provided thereon with also a pair of door receiving means, arranged with the robot therebetween in the direction along the moving direction of the carriage, for receiving the door taken out by the robot from one of the pallets, and at least one of the door receiving means is accompanied with the door positioning means which is operative to position the door received by that one of the door receiving means in proper relation to the robot.

In the apparatus thus constituted in accordance with the present invention, the door selected to be set to the vehicle body is efficiently taken out by the robot from the pallets and then held by the robot always in a proper manner so as to be set to the vehicle body at the door mounting station after being positioned in proper relation to the robot by the door positioning means. Consequently, positional deviation of the door set to the vehicle body by the robot from a corresponding door supporting portion provided on the vehicle body is eliminated.

In the embodiment including the body position detecting means, even though the vehicle body conveyed to the door mounting station is caused to stay at a position deviated from a predetermined regular position in the door mounting station, the door held by the robot to be set to the vehicle body is caused to coincide precisely with the actual position of the corresponding door supporting portion of the vehicle body at the door mounting station when the door is actually set to the vehicle body by the robot.

The above, and other objects, features and advantages of the following detailed description which is to be read in conjunction with the accompanying drawings.

DESCRIPTION OF THE PREFERRED EMBODIMENT

Now, an embodiment of apparatus for setting a door to a vehicle body according to the present invention will be described in detail with reference to the accompanying drawings hereinafter.

Figure 1:
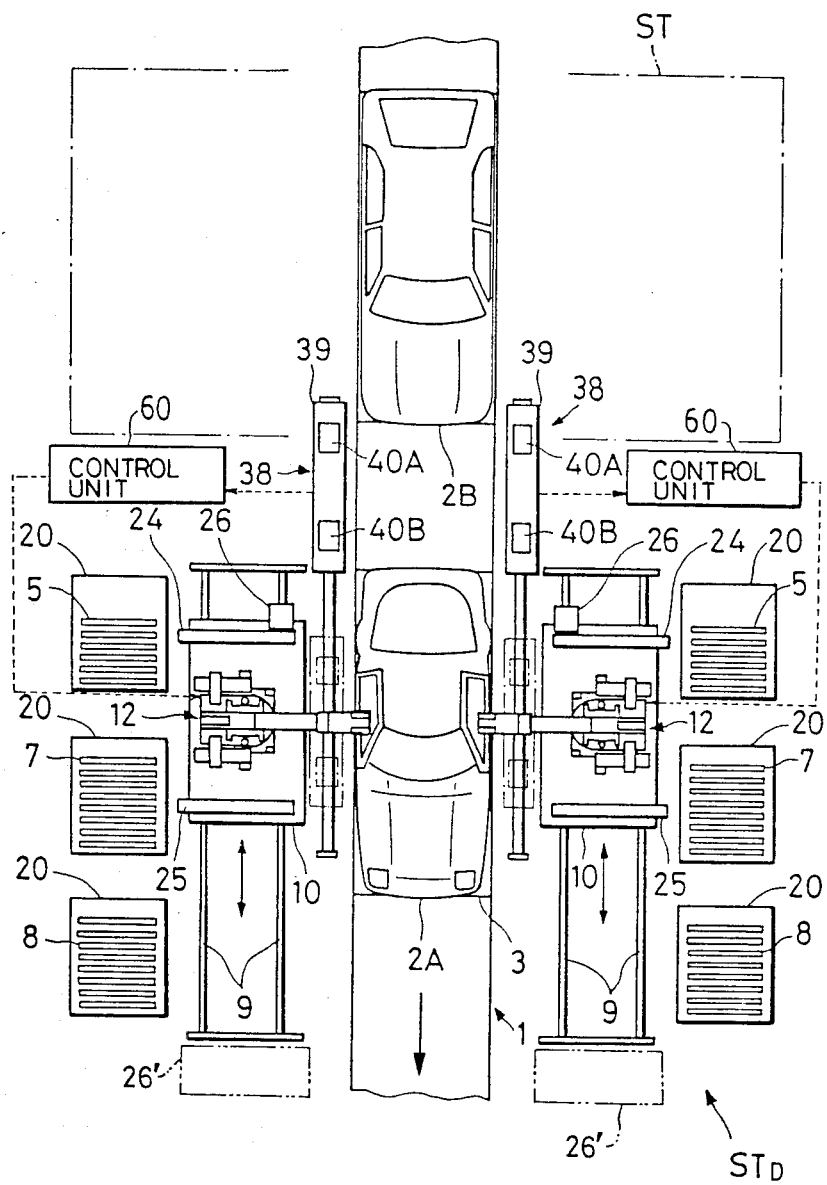
FIG. 1 is a schematic plane view showing an embodiment of apparatus for setting a door to a vehicle body according to the present invention.

FIG. 1 shows schematically one example of the apparatus according to the present invention and FIGS. 2 to 9 show in detail various portions of the example shown in FIG. 1.

Figure 6:
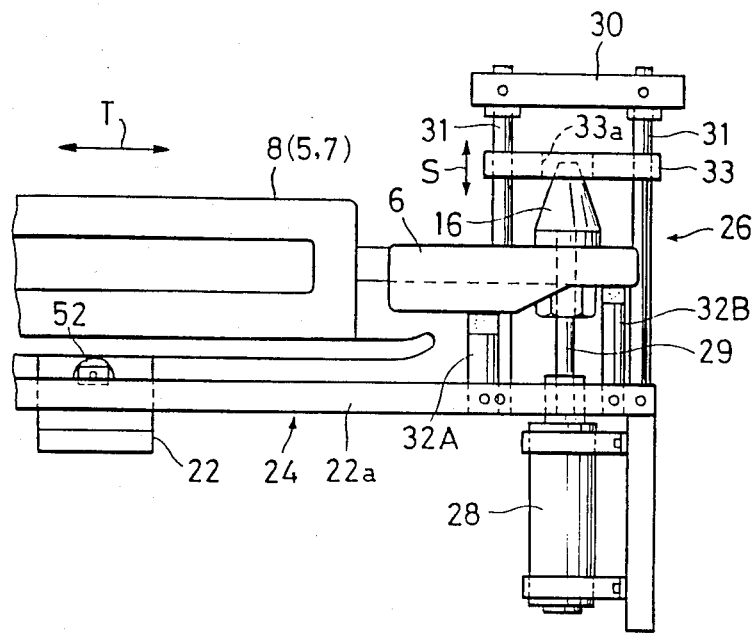
FIGS. 6 and 7 are plane and perspective views, respectively, showing a portion of the embodiment shown in FIG. 1 in which a door positioning mechanism is included.
Figure 7:
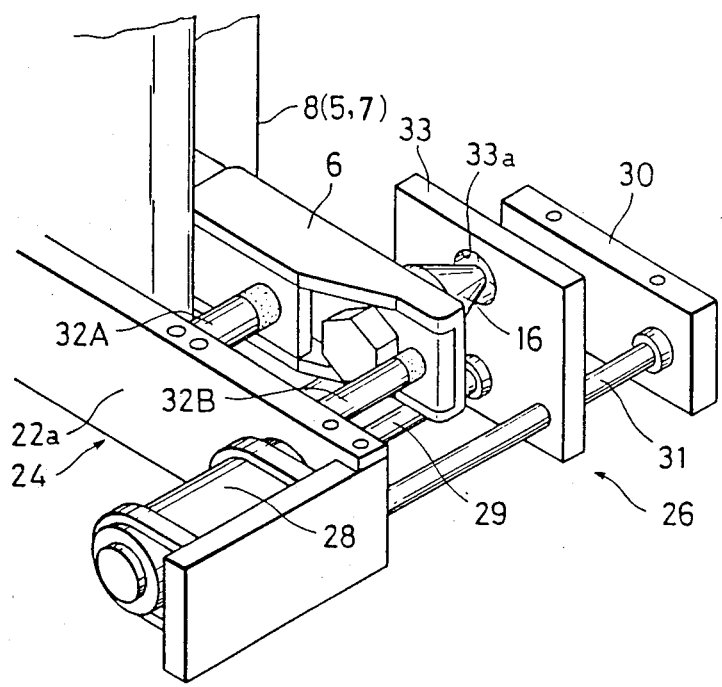

Referring to FIG. 1, a vehicle body assembly line 1 which is so arranged that a plurality of vehicle bodies of two different types are assembled therein is provided with a door mounting station $ST_D$ successive to a preceding working station ST. In the vehicle body assembly line 1, vehicle bodies 2A and 2B of different types are fixed on a floor conveyer 3 and conveyed to the door mounting station $ST_D$ successively in the order determined in accordance with, for example, a daily production plan. Each of the vehicle bodies 2A and 2B conveyed into the door mounting station $ST_D$ is caused to stay thereat for a predetermined duration so as to be subjected to the door mounting process in which left and right front doors 5 are mounted on the respective door supporting portions, such as pillars, provided on the vehicle body 2A, and left and right front doors 7 and left and right rear doors 8 are mounted on the respective door supporting portions, such as pillars, provided on the vehicle body 2B. As illustrated in FIGS. 6 and 7, each of these doors 5, 7 and 8 has an engaging projection 6 for engaging with the corresponding door supporting portion of the vehicle body 2A or 2B to form a door hinge, and the engaging projection 6 is provided with a tapering pin 16.

Figure 2:
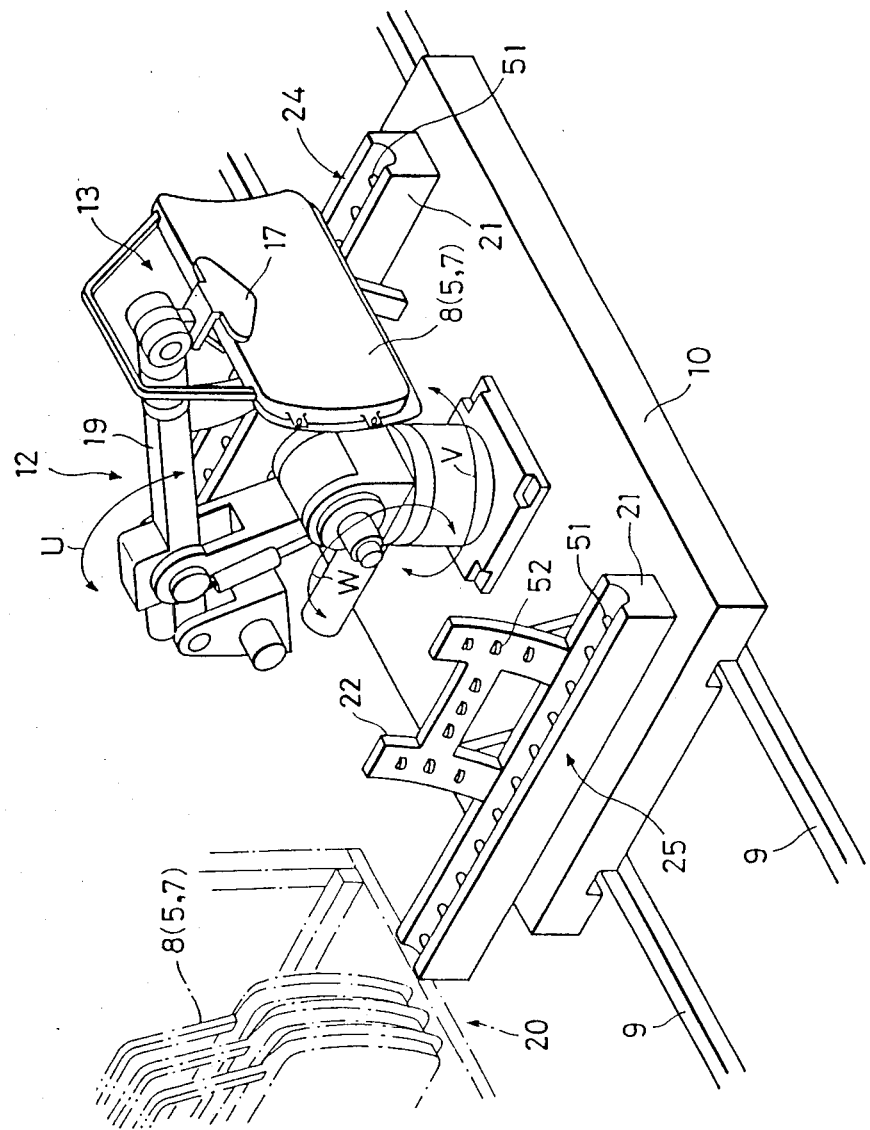
FIG. 2 is a perspective view showing a portion of the embodiment shown in FIG. 1 in which a robot and a pair of door stands are included.

At the door mounting station $ST_D$, a couple of robots 12 for door setting are provided on both sides of the vehicle body assembly line 1, respectively. As shown in FIGS. 1 and 2, each of these robots 12 is installed on a carriage 10 which is operative to run on a rail track 9 extending along the vehicle body assembly line 1.

Figure 3:
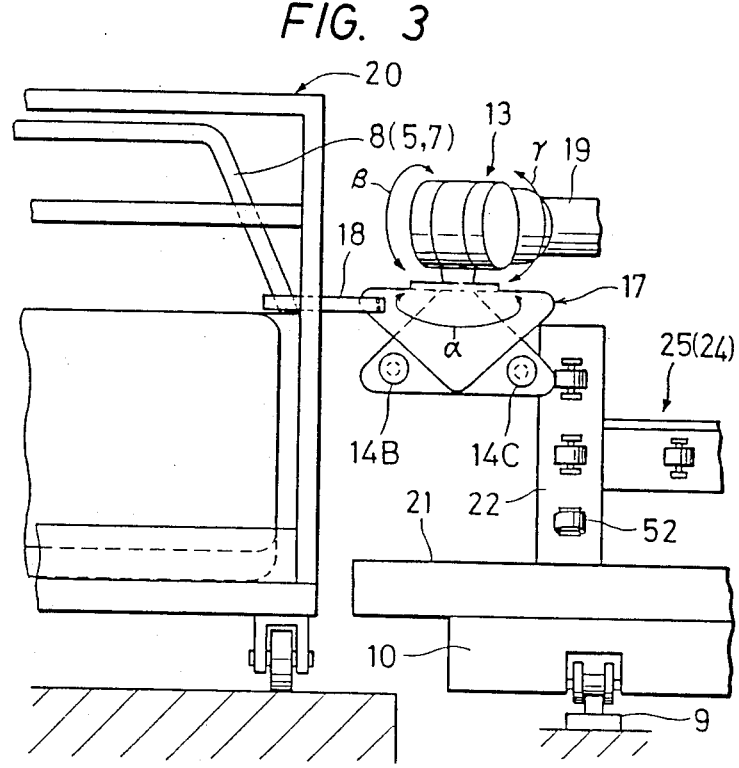
FIGS. 3 to 5 are side views used for explaining the configuration and operation of the robot and the door stand shown in FIG. 2.
Figure 5:
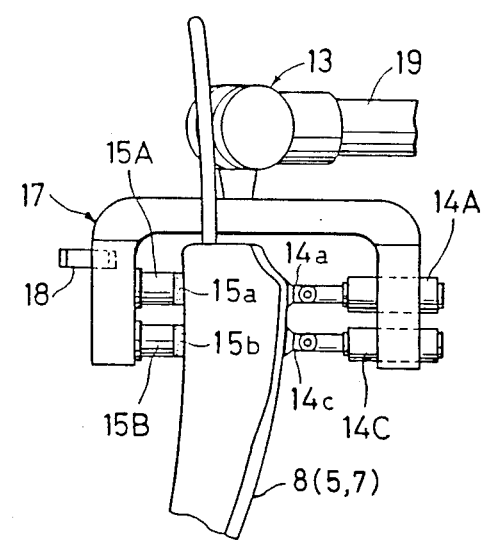

The robot 12 is formed into a playback robot of the articulated type having a wrist 13 jointing a hand 17 with an arm 19. As shown in FIGS. 3 and 5, the hand 17 is formed to be ⊐-shape in its entirety (FIG. 5) and has cylinder devices 14A, 14B and 14C provided with clinging ends 14a, 14b and 14c, respectively, (the clinging end 14b is not sighted in FIGS. 3 and 5) for clinging to the door 5, 7 or 8 and fixed receiving members 15A and 15B provided with resilient pads 15a and 15b for holding the door 5, 7 or 8 in cooperation with the cylinder devices 14A, 14B and 14C. The hand 17 is further provided with a hook 18 for engaging with the door 5, 7 or 8 put on a pallet 20 described in detail later and pulling out the door 5, 7 or 8 from the pallet 20.

In such a robot 12, as shown in FIG. 2, a handling arrangement comprising the wrist 13, the hand 17 and the arm 19 moves on a base fixed on the carriage 10 to rotate within the range of an angle of, for example, 300 degrees in the direction indicated by V (the V direction), within the range of an angle of, for example, 90 degrees in the direction indicated by W (the W direction), and within the range of an angle of, for example, 105 degrees in the direction indicated by U (the U direction). Further, as shown in FIG. 3, the hand 17 moves in relation to the wrist 13 to rotate within the range of an angle of, for example, 360 degrees in the direction indicated by $\alpha$ (the $\alpha$ direction) and within the range of an angle of, for example, 210 degrees in the direction indicated by $\beta$ (the $\beta$ direction), and the wrist 13 moves in relation to the arm 19 to rotate within the range of an angle of 360 degrees in the direction indicated by $\gamma$ (the $\gamma$ direction). Accordingly, the position of the hand 17 in the movement thereof, that is, the effective working position of the robot 12 is determined by six parameters representing the respective rotating angles in the V, W, U, $\alpha$, $\beta$ and $\gamma$ directions.

A locus of the effective working position of the robot 12, that is, a working path of the robot 12 is controlled by a control unit 60 which is provided individually for each robot 12 and in which data for predetermining the working path of the robot 12 is memorized on a memory contained therein, and when a control signal OCp which provides all such six parameters as mentioned above, as described later, is supplied to the robot 12, the robot 12 performs a necessary operation for setting each of the doors 5, 7 and 8 to the corresponding door supporting portion of the vehicle body 2A or 2B at the door mounting station $ST_D$ with the predetermined working path represented by the control signal OCp.

Referring again to FIG. 1, at the door mounting station $ST_D$, a plurality of pallets 20 is provided on both sides of the vehicle body assembly line 1 to be arranged along the moving direction of the carriage 10, on which the robot 12 is installed. The pallets 20 arranged on either side of the vehicle body assembly line 1 sort and store thereon the doors 5, 7 and 8 so as to make a group of the front doors 5, a group of the front doors 7 and a group of the rear doors 8, respectively. Each pallet 20 is formed to be a movable box having openings at the top and side, and therefore the door 5, 7 or 8 stored on the pallet 20 can be pulled out from the side of the pallet 20 facing to the vehicle body assembly line 1.

Figure 4:
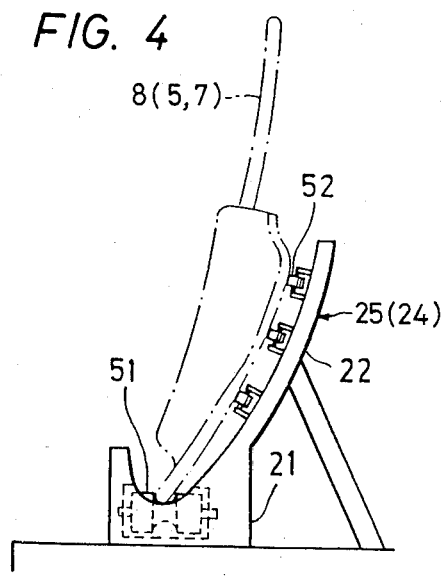

Each carriage 10 on which the robot 12 is installed is provided thereon with also a pair of door stands 24 and 25 which are arranged with the robot 12 therebetween in the direction along the moving direction of the carriage 10 for receiving and standing the door 5, 7 or 8 pulled out by the robot 12 from the pallet 20. As shown in FIGS. 2 and 4, each of the door stands 24 and 25 has a bottom support member 21 provided with a plurality of rollers 51 and a back support member 22 provided also with a plurality of rollers 52 both for engaging with the door 5, 7 or 8, so that the door 5, 7 or 8 transferred to the door stand 24 or 25 from the pallet 20 can easily move upward or toward the vehicle body assembly line 1.

The door stand 24 is accompanied with a door positioning mechanism 26 for positioning the door 5, 7 or 8 received by the door stand 24. As shown in FIGS. 6 and 7, the door positioning mechanism 26 includes a cylinder device 28 fixed to a supporting member 22a which is elongated from the back support member 22 of the door stand 24, and a positioning plate 33 moved by a piston rod 29 of the cylinder device 28 in the direction indicated by an arrow S having a couple of heads at both ends in FIG. 6 under the guidance by a guiding bar 31 supported by a fixed supporting member 30. The positioning plate 33 has a positioning opening 33a which is formed to engage with the tapering pin 16 provided on the engaging projection 6 of the door 5, 7 or 8 and thereby to position the door 5, 7 or 8 in proper relation to the robot 12 so that the positioned door 5, 7 or 8 is held by the robot 12 in a proper manner. The door positioning mechanism 26 includes also pads 32A and 32B fixed to the supporting member 22a so as to come into contact with the engaging projection 6 of the door 5, 7 or 8 when the positioning opening 33a engages with the tapering pin 16.

In the vehicle body assembly line 1 described above, if the vehicle body 2A or 2B is put on the floor conveyer 3 with positional deviation from a regular position on the floor conveyer 3 and therefore the vehicle body 2A or 2B conveyed into the door mounting station $ST_D$ is caused to stay at a position deviated from a predetermined regular position in the door mounting station $ST_D$, the door 5, 7 or 8 may not be set by the robot 12 properly to the corresponding door supporting portion of the vehicle body 2A or 2B staying at the door mounting station $ST_D$.

Accordingly, to avoid such a trouble, in the embodiment shown in FIG. 1, there is further provided a couple of body position detecting devices 38 for detecting the position of the vehicle body 2A or 2B which is caused to stay at the door mounting station $ST_D$. The body position detecting devices 38 are located on both sides of the vehicle body assembly line 1, respectively, so as to be movable along the vehicle body assembly line 1.

Figure 8:
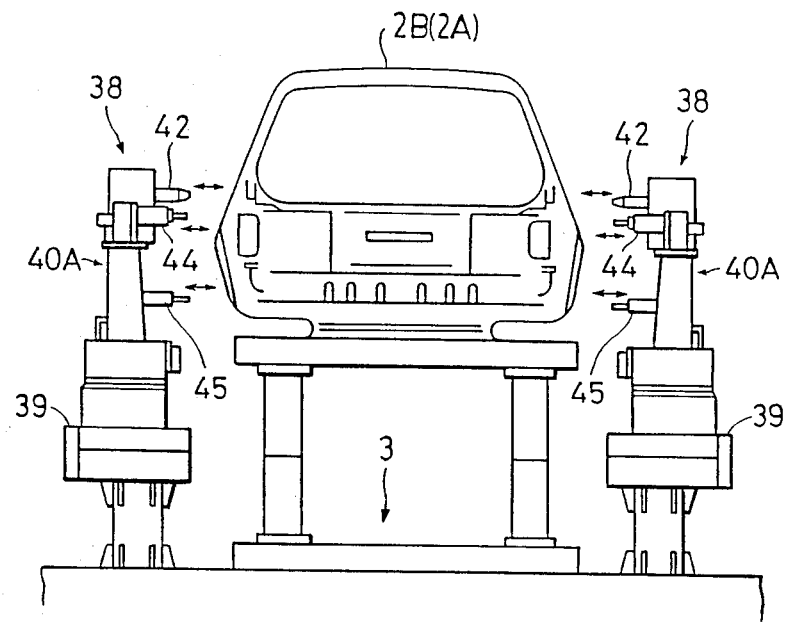
FIGS. 8 and 9 are side and perspective views, respectively, showing a portion of the embodiment shown in FIG. 1 in which a body position detecting device is included.
Figure 9:
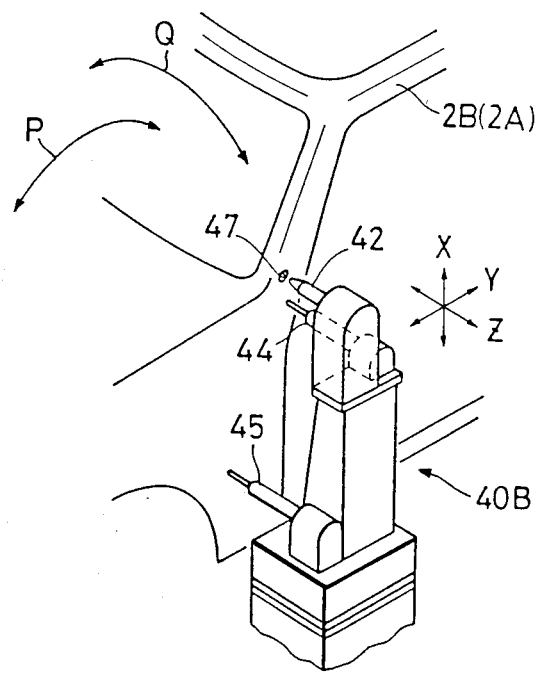

As shown in FIGS. 8 and 9, each body position detecting device 38 comprises a sliding table 39 which is mounted to be movable in parallel with the vehicle body assembly line 1 and a pair of position detectors 40A and 40B fixed on the sliding table 39 with a predetermined space therebetween. Each of the position detectors 40A and 40B is provided with a detecting pin 42 having a tapering end portion for engaging with a hole 47 formed on the vehicle body 2A or 2B, as shown in FIG. 9, and a pair of attitude sensors 44 and 45 located with predetermined spaces in both directions of the height and the length of the vehicle body 2A or 2B so as to come into contact with the side surface of the vehicle body 2A or 2B at two points thereon.

When the position of the vehicle body 2A or 2B at the door mounting station $ST_D$ is detected by the body position detecting device 38 thus constituted, the tapering end portion of the detecting pin 42 is inserted into the hole 47 of the vehicle body 2A or 2B and simultaneously the attitude sensors 44 and 45 are caused to be in contact with the side surface of the vehicle body 2A or 2B. The detecting pin 42 is moved to expand and contract and also to incline in response to the positional deviation of the hole 47 resulted from the positional deviation of the vehicle body 2A or 2B from the predetermined regular position in the door mounting station $ST_D$ so as to be inserted into the hole 47. Accordingly, the positional deviation in the X direction $\Delta\theta x$ of the vehicle body 2A or 2B is detected on the strength of a length of the detecting pin 42 from the base portion to the tapering end portion thereof and an angle between the detecting pin 42 and the X coordinate axis passing through the base portion of the detecting pin 42, and the positional deviation in the Y direction $\Delta\theta y$ of the vehicle body 2A or 2B is detected on the strength of the length of the detecting pin 42 from the base portion to the tapering end portion thereof and an angle between the detecting pin 42 and the Y coordinate axis passing through the base portion of the detecting pin 42. Further, the positional deviation in the Z direction $\Delta\theta z$ of the vehicle body 2A or 2B is detected on the strength of the length of the detecting pin 42 from the base portion to the tapering end portion thereof and the positional deviations in the X and Y directions $\Delta\theta x$ and $\Delta\theta y$.

The attitude sensors 44 and 45 are moved to expand and contract in response to the attitude of the vehicle body 2A or 2B on the floor conveyer 3 in the directions indicated respectively by P and Q in FIG. 9 (the P and Q directions) so as to be caused to contact with the side surface of the vehicle body 2A or 2B. Accordingly, the inclination in the P direction $\Delta\theta p$ and the inclination in the Q direction $\Delta\theta q$ of the vehicle body 2A or 2B are detected on the strength of the length of each of the attitude sensors 44 and 45 provided on two pairs of position detectors 40A and 40B located on both sides of the vehicle body assembly line 1, respectively.

Figure 10:
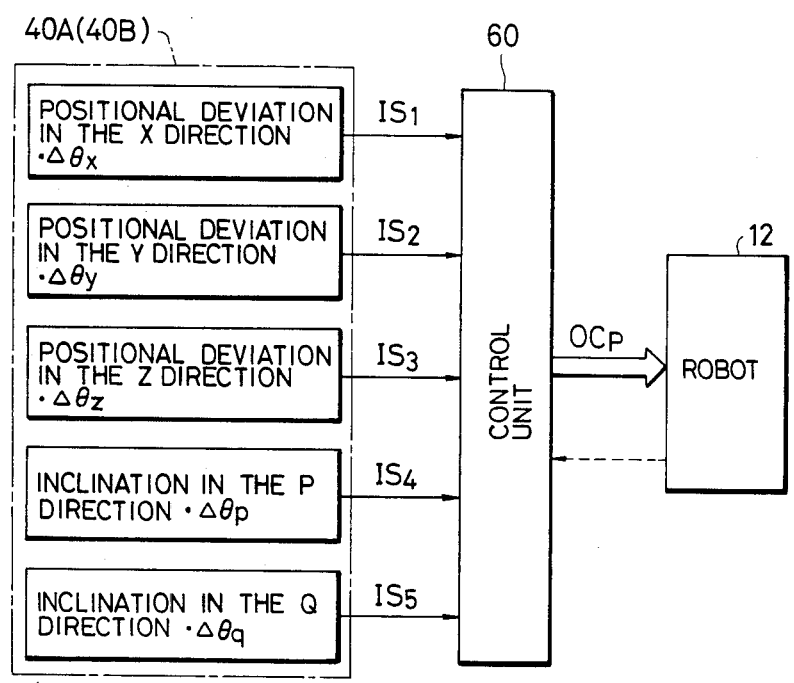
FIG. 10 is a block diagram used for explaining the operation of a control unit employed in the embodiment shown in FIG. 1.

As shown in FIG. 10, these positional deviations in the X, Y and Z directions $\Delta\theta x$, $\Delta\theta y$ and $\Delta\theta z$ and the inclinations in the P and Q directions $\Delta\theta p$ and $\Delta\theta q$ detected by the position detectors 40A and 40B as mentioned above are converted into detection signals $IS_1$, $IS_2$, $IS_3$, $IS_4$ and $IS_5$, respectively, in the position detectors 40A and 40B, and the detection signals $IS_1$, $IS_2$, $IS_3$, $IS_4$ and $IS_5$ are supplied to the control unit 60. The control unit 60 calculates an actual position of the vehicle body 2A or 2B at the door mounting station $ST_D$ on the basis on the detection signals $IS_1$, $IS_2$, $IS_3$, $IS_4$ and $IS_5$, and compensates the data memorized on the memory contained therein for predetermining the working path of the robot 12 to be appropriate for the actual position of the vehicle body 2A or 2B. Then, the control signal OCp which corresponds to the compensated data is supplied from the control unit 60 to the robot 12 and therefore the robot 12 operates to set the door 5, 7 or 8 to the corresponding door supporting portion of the vehicle body 2A or 2B at the door mounting station $ST_D$ with the predetermined working path represented by the control signal OCp.

Now, the sequential operation of the embodiment of the present invention constituted as described above for setting the door 5, 7 or 8 to the corresponding door supporting portion of the vehicle body 2A or 2B at the door mounting station $ST_D$ will be explained hereinafter.

When the vehicle body 2A or 2B is conveyed into the door mounting station $ST_D$ and caused to stay thereat, the sliding table 39 of the body position detecting device 38 is moved into a predetermined detecting position in the door mounting station $ST_D$ indicated with a dot-dash line in FIG. 1, and the body position detecting device 38 moved by the sliding table 39 into the predetermined detecting position causes the detecting pin 42 and the attitude sensors 44 and 45 provided on each of the position detectors 40A and 40B to project toward the vehicle body 2A or 2B.

The detecting pin 42 caused to project is inserted into the hole 47 provided on the vehicle body 2A or 2B so as to expand or contract and incline in response to the position of the hole 47, so that the positional deviations in the X, Y and Z directions $\Delta\theta x$, $\Delta\theta y$ and $\Delta\theta z$ of the vehicle body 2A or 2B are detected as described above and the detection signals $IS_1$, $IS_2$ and $IS_3$ are supplied from the position detectors 40A and 40B to the control unit 60. Further, the attitude sensors 44 and 45 caused to project comes into contact with the side surface of the vehicle body 2A or 2B so as to expand and contract in response to the attitude of the vehicle body 2A or 2B on the floor conveyer 3, so that the inclinations in the P and Q directions $\Delta\theta p$ and $\Delta\theta q$ of the vehicle body 2A or 2B are detected as described above and the detection signals $IS_4$ and $IS_5$ are supplied from the position detectors 40A and 40B to the control unit 60. The control unit 60 calculates the actual position of the vehicle body 2A or 2B and compensates the data for predetermining the working path of the robot 12 as mentioned above.

After the detection of the position of the vehicle body 2A or 2B by the body position detecting device 38 is completed, the sliding table 39 of the body position detecting device 38 leaves from the detecting position in the door mounting station $ST_D$ and the door setting operation for setting the front door 5 to the vehicle body 2A or for setting the front and rear doors 7 and 8 to the vehicle body 2B is commenced.

In the door setting operation, the carriage 10 on which the robot 12 is installed is moved into a position where the door stand 24 or 25 provided on the carriage 10 is placed to correspond to one of the door 5, 7 or 8 at the rear end in the pallet 20, as shown in FIG. 2. Then, the robot 12 starts operating to rotate the arm 19 so that the hook 18 extending from the hand 17 engages with that one of the door 5, 7 or 8 and the door 5, 7 or 8 engaged with the hook 18 is pulled out of the pallet 20 to be received by the door stand 24 or 25. In such transfer of the door 5, 7 or 8, since the door stands 24 and 25 are arranged with the robot 12 therebetween in the direction along the moving direction of the carriage 10, the front door 5 for the vehicle body 2A or the front door 7 for the vehicle body 2B is pulled out to be received by the door stand 24 and the rear door 8 for the vehicle body 2B is pulled out to be received by the door stand 25, for example, so that the moving distance required for the carriage 10 to transfer the door 5, 7 or 8 to the door stand 24 or 25 is reduced and therefore the operation time is saved. The rear door 8 received by the door stand 25 is held between the clinging ends 14a, 14b and 14c of the cylinder devices 14A, 14B and 14C, and the resilient pads 15a and 15b of the fixed receiving members 15A and 15B, which are provided on the hand 17 of the robot 12, and transferred to the door stand 24 through the rotation of the robot 12.

The front door 5 or 7 pulled out to be received directly by the door stand 24 or the rear door 8 transferred to the door stand 24 from the door stand 25 as mentioned above, is subjected to positioning by the door positioning mechanism 26. In such positioning for the door 5, 7 or 8, as shown in FIGS. 6 and 7, the cylinder device 28 of the door positioning mechanism 26 is actuated to pull the piston rod 29 in. With the movement of the piston rod 29 pulled in, the positioning plate 33 is moved to approach to the engaging projection 6 extending from the door 5, 7 or 8 and then the positioning opening 33a formed on the positioning plate 33 engages with the tapering pin 16 provided on the engaging projection 6 to position the door 5, 7 or 8. Through this engagement of the positioning opening 33a with the tapering pin 16, the door 5, 7 or 8 may be moved in the direction by an arrow T having a couple of heads at both ends in FIG. 6 so as to be positioned in proper relation to the robot 12.

After being positioned by the door positioning mechanism 26 at the door stand 24, the door 5, 7 or 8 is held by the hand 17 of the robot 12 in the same manner as the rear door 8 in the transfer thereof to the door stand 24 from the door stand 25, and carried upward and rotated through the movement of the arm 19 of the robot 12, as shown in FIG. 2. Then, the carriage 10 is moved to carry the door 5, 7 or 8 so as to approach to the corresponding door supporting portion, such as a front pillar or a rear pillar, of the vehicle body 2A or 2B, and the robot 12 rotates each of the arm 19, wrist 13 and hand 17 to follow the predetermined working path represented by the control signal OCp from the control unit 60 so as to get the door 5, 7 or 8 ready for being set and then to set the same to the corresponding door supporting portion of the vehicle body 2A or 2B.

In such a sequential door setting operation as explained above, since the door 5, 7 or 8 is positioned in proper relation to the robot 12 by the door positioning mechanism 26 prior to being held by the robot 12, the robot 12 holds the door 5, 7 or 8 always in a proper manner for setting the same to the corresponding door supporting portion of the vehicle body 2A or 2B. Further, since the predetermined working path of the robot 12 is compensated to be appropriate for the actual position of the vehicle body 2A or 2B in the door mounting station $ST_D$ in accordance with the detection outputs of the door position detecting device 38, the robot 12 gets the door 5, 7 or 8 appropriately ready for being set to the corresponding door supporting portion of the vehicle body 2A or 2B. Consequently, when the door 5, 7 or 8 is set to the vehicle body 2A or 2B by the robot 12, positional deviation of the door 5, 7 or 8 from the corresponding door supporting portion of the vehicle body 2A or 2B is always eliminated.

Although, in the embodiment described above, each of the door positioning mechanisms 26 is attached to the door stand 24 which is provided on the carriage 10, it is to be understood that various other ways may be taken for positioning the door 5, 7 or 8 in the proper relation to the robot 12. By way of example, a couple of door positioning mechanisms 26' which are located on both side of the vehicle body assembly line 1, respectively, to be close to the respective rail tracks 9, as indicated with a dot-dash line in FIG. 1, may be used for receiving the door 5, 7 or 8 pulled out of the pallet 20 and for positioning the same, in place of the door positioning mechanisms 26.

What is claimed is:

1. Apparatus for setting a door to a vehicle body comprising;
    a robot installed on a carriage movable along a vehicle body assembly line and operating with a predetermined working path to hold and carry a door,
    a plurality of pallets arranged along a moving direction of said carriage for sorting and storing doors of plural different types thereon, and
    door positioning means for positioning a door taken out by said robot from one of said pallets in proper relation to said robot,
    the apparatus being so constituted that when a vehicle body is conveyed to a door mounting station in said vehicle body assembly line, said robot picks out one of the doors sorted on said pallets, which is fit for said vehicle body conveyed or being to be conveyed to the door mounting station, to cause the same to engage with said door positioning means so that the door picked out by said robot is positioned by said positioning means, and then holds and carries the door positioned by said door positioning means to set the same to the vehicle body at the door mounting station.

2. Apparatus according to claim 1, wherein said door positioning means is provided on said carriage.

3. Apparatus according to claim 2 further comprising a pair of door receiving means for receiving the door taken out by said robot from one of said pallets, said door receiving means being provided on said carriage to be arranged with said robot therebetween in the direction along the moving direction of said carriage.

4. Apparatus according to claim 3, wherein at least one of said door receiving means is accompanied with said door positioning means.

5. Apparatus according to claim 3, wherein only one of said door receiving means is accompanied with said door positioning means.

6. Apparatus according to claim 3, wherein said door positioning means comprises a cylinder device fixed on said carriage and having a piston rod, and a movable plate member coupled with said piston rod to be moved thereby and having a positioning opening provided thereon for engaging with a tapering pin projecting from the door received by said one of said door receiving means.

7. Apparatus according to claim 6, wherein said door positioning means further comprises a supporting member extending from said one of said door receiving means for supporting said cylinder device, and a guiding member for guiding said movable plate member so as to ensure the movement of said movable plate member caused by said piston rod.

8. Apparatus according to claim 1, wherein said robot comprises a hand member for holding a portion of one of the door sorted on said pallets, an arm member mounted on said carriage to be rotatable in at least two defferent rotating directions, and a wrist member for jointing said hand member with said arm member so that said hand member is able to rotate in relation to said arm member in three defferent rotating directions.

9. Apparatus according to claim 8, wherein said hand member comprises clinging means for clinging to said one of the door and receiving means placed to face to said clinging means for holding said one of the door in cooperation with said clinging means.

10. Apparatus according to claim 9, wherein said hand member further comprises hook means for engaging with said one of the door to pull the same out of one of said pallets.

11. Apparatus according to claim 1 further comprising body position detecting means for detecting the position of the vehicle body conveyed to and caused to stay at the door mounting station, and means for compensating the predetermined working path of said robot to be appropriate for the actual position of the vehicle body at the door mounting station in accordance with the detection output of said body position detecting means.

12. Apparatus according to claim 11, wherein said body position detecting means comprises a sliding table mounted to be movable along the vehicle body assembly line, and a position detector provided on said sliding table for detecting positional deviation of the vehicle body from a predetermined regular position in the door mounting station.

13. Apparatus according to claim 12, wherein said position detector comprises a detecting pin having a tapering end portion for engaging with a hole formed on the vehicle body staying at the door mounting station, said detecting pin moving to expand and contract and also to incline in response to positional deviation of the hole resulted from the positional deviation of the vehicle body from the predetermined regular position in the door mounting station.

14. Apparatus according to claim 12, wherein said position detector further comprises a contact sensor for coming into contact with the side surface of the vehicle body staying at the door mounting station, said contact sensor moving to expand and contract in response to the inclination of the vehicle body staying at the door mounting station.

15. Apparatus according to claim 11, wherein said body position detecting means comprises first and second sliding tables mounted on both sides of the vehicle body assembly line, respectively, to be movable along the vehicle body assembly line, and first and second position detectors provided on said first and second sliding tables, respectively, for detecting positional deviation of the vehicle body from a predetermined regular position in the door mounting station.

16. Apparatus according to claim 15, wherein each of said first and second position detectors comprises a detecting pin having a tapering end portion for engaging with a hole formed on the vehicle body staying at the door mounting station, said detecting pin moving to expand and contract and also to incline in response to positional deviation of the hole resulted from the positional deviation of the vehicle body from the predetermined regular position in the door mounting station.

17. Apparatus according to claim 16, wherein each of said first and second position detectors further comprises a contact sensor for coming into contact with the side surface of the vehicle body staying at the door mounting station, said contact sensor moving to expand and contract in response to the inclination of the vehicle body staying at the door mounting station.

* * * * *